United States Patent
Chang et al.

(10) Patent No.: US 7,859,840 B2
(45) Date of Patent: Dec. 28, 2010

(54) PORTABLE HEAT DISSIPATION DEVICE WITH CROSS FLOW FAN

(76) Inventors: Su-Ben Chang, P.O. Box 46-766, Taipei City 10499 (TW); Wei-Fu Chang, P.O. Box 46-766, Taipei City 10499 (TW); Wei-Yu Chang, P.O. Box 46-766, Taipei City 10499 (TW)

( * ) Notice: Subject to any disclaimer, the term of this patent is extended or adjusted under 35 U.S.C. 154(b) by 0 days.

(21) Appl. No.: 12/697,588

(22) Filed: Feb. 1, 2010

(65) Prior Publication Data

US 2010/0134977 A1 Jun. 3, 2010

Related U.S. Application Data

(63) Continuation-in-part of application No. 12/289,103, filed on Oct. 21, 2008, now abandoned.

(30) Foreign Application Priority Data

Jan. 11, 2008 (TW) .............................. 97200717 U (51) Int. Cl.
*H05K 7/20* (2006.01)
(52) U.S. Cl. ..................................... 361/695; 361/694
(58) Field of Classification Search ................................
361/679.48–679.51, 695
See application file for complete search history.

(56) References Cited

U.S. PATENT DOCUMENTS

| 5,898,568 | A | * | 4/1999 | Cheng | 361/695 |
| 6,047,765 | A | * | 4/2000 | Zhan | 165/80.3 |
| 6,172,416 | B1 | * | 1/2001 | Miyahara et al. | 257/712 |
| 6,239,971 | B1 | * | 5/2001 | Yu et al. | 361/695 |
| 6,738,256 | B2 | * | 5/2004 | Hsieh et al. | 361/679.47 |
| 6,894,896 | B2 | * | 5/2005 | Lin | 361/695 |
| 2006/0114653 | A1 | * | 6/2006 | Seto et al. | 361/695 |
| 2006/0233638 | A1 | * | 10/2006 | Chen | 415/53.1 |
| 2008/0232063 | A1 | * | 9/2008 | Koo | 361/687 |
| 2009/0078120 | A1 | * | 3/2009 | Kummer et al. | 96/222 |

* cited by examiner

*Primary Examiner*—Gregory D Thompson
(74) *Attorney, Agent, or Firm*—Rosenberg, Klein & Lee (57) ABSTRACT

A portable heat dissipation device is provided for operation with various devices of different purposes for heat dissipation therefrom and includes an enclosure and an air flow generation device. The air flow generation device is set in a given chamber inside the enclosure to effect flowing of air, causing air to enter through an inlet opening defined in a top of the enclosure and forcing the air flowing out through an outlet opening defined in a front wall of the enclosure. The portable heat dissipation device, when applied to remove heat, provides high performance of heat dissipation and effectively extended time interval of operation to thereby extend the lifespan of the device.

14 Claims, 10 Drawing Sheets

PORTABLE HEAT DISSIPATION DEVICE WITH CROSS FLOW FAN

CROSS-REFERENCES TO RELATED APPLICATIONS

This application is a continuation-in-part of Ser. No. 12/289,103 filed on Oct. 21, 2008, entitled "Portable Heat Dissipation Device with Cross Flow Fan", now ABN.

FIELD OF THE INVENTION

The present invention relates to a portable heat dissipation device, and in particular to a heat dissipation device that supports heat dissipation operations for various devices of different purposes, whereby the use of the portable heat dissipation device ensures high performance of heat removal and effectively extended time interval of operation and extended lifespan.

BACKGROUND OF THE INVENTION

With the increasing development of technology and science, the performance of electronic devices has greatly improved, such as the remarkable increase of the operation speed of a central processing unit (CPU) or the development of multiple CPU based operation configuration. Consequently, the amount of data processed and the speed of processing data are both increased remarkably. However, the overall configuration is set in a trend of being light-weighted and compact and this often leads to poor heat dissipation of the electronic device, making it difficult for the electronic device to run for a very long while. In addition, it is very likely that dust covers on an existing heat dissipation device built in the electronic device, which may deteriorate the dissipation of heat, eventually making the electronic device failing to properly function.

A heat dissipation device that works with a notebook computer, an electronic game machine, or other electronic devices often adopts an axial flow fan, which is positioned in front of or under a target component from which heat is to be removed. To increase the air flow rate, the size of the fan must be correspondingly increased or additional fans have to be provided. However, increasing the fan size means a corresponding increase of the footprint of the heat dissipation device, making it inconvenient to carry or use. Increasing the number of fans may cause increased noise level generated by the fans and also induces excessive vibration that affect the comfortableness of using the electronic device.

Apparently, the conventional heat dissipation device is subjected to the limitation in size and/or quantity of the fans, leading to excessively large footprint of the heat dissipation device that makes carrying difficult and/or raised levels of noise and vibration. Thus, there is a need to improve the conventional heat dissipation device.

SUMMARY OF THE INVENTION

An objective of the present invention is to provide a portable heat dissipation device featuring high performance of heat removal, extended time interval of operation, and extended lifespan.

Another objective of the present invention is to provide a portable heat dissipation device that effectively lowers the levels of noises and vibration generated.

A further objective of the present invention is to provide a portable heat dissipation device that enhances the comfortableness of using the device.

A further objective of the present invention is to provide a portable heat dissipation device that is easy to carry and that occupies a less amount of space.

A further objective of the present invention is to provide a portable heat dissipation device that receives multiple options of power supply.

A further objective of the present invention is to provide a portable heat dissipation device that features adjustable wind power and adjustable flow rate of air discharged therefrom.

Yet a further objective of the present invention is to provide a portable heat dissipation device with a direction-exchangeable air flow generation module which may be at a first assembly position adapted to be mounted into a concave accommodating dock of the enclosure, so as to generate a first directional air flow. Alternatively, the direction-exchangeable air flow generation device may be at a second assembly position selectively adapted to be mounted into the concave accommodating dock of the enclosure, so as to generate a second directional air flow.

To realize the above objectives, in accordance with an aspect of the present invention, a portable heat dissipation device comprises an air flow generation device, an enclosure, and movable support arms, wherein the air flow generation devices comprises a cross flow fan that is rotatable to induce air flow and a driving source that drives the cross flow fan.

The enclosure comprises a lower container that defines therein a receiving space for receiving and retaining inside parts/components and including a middle chamber that receives and retains the cross flow fan and other chambers for accommodating a battery and the driving source that drives the cross flow fan. The driving source is further connected to an external power inlet socket, whereby supply of power is optionally the built-in battery or an external power source. The lower container further defines an inlet opening and outlet opening in perpendicular walls of a top cover and the lower container at locations close to the cross flow fan for providing passages for the air flow.

Further, the lower container comprises collapsible movable support arms that are provided at the same wall as the outlet opening and the movable support arms are provided with damper pads at locations where a device from which heat is to be removed is set.

In a preferred embodiment, the air flow generation device is connected to a multiple-position switch for adjustably setting wind power of the air flow.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
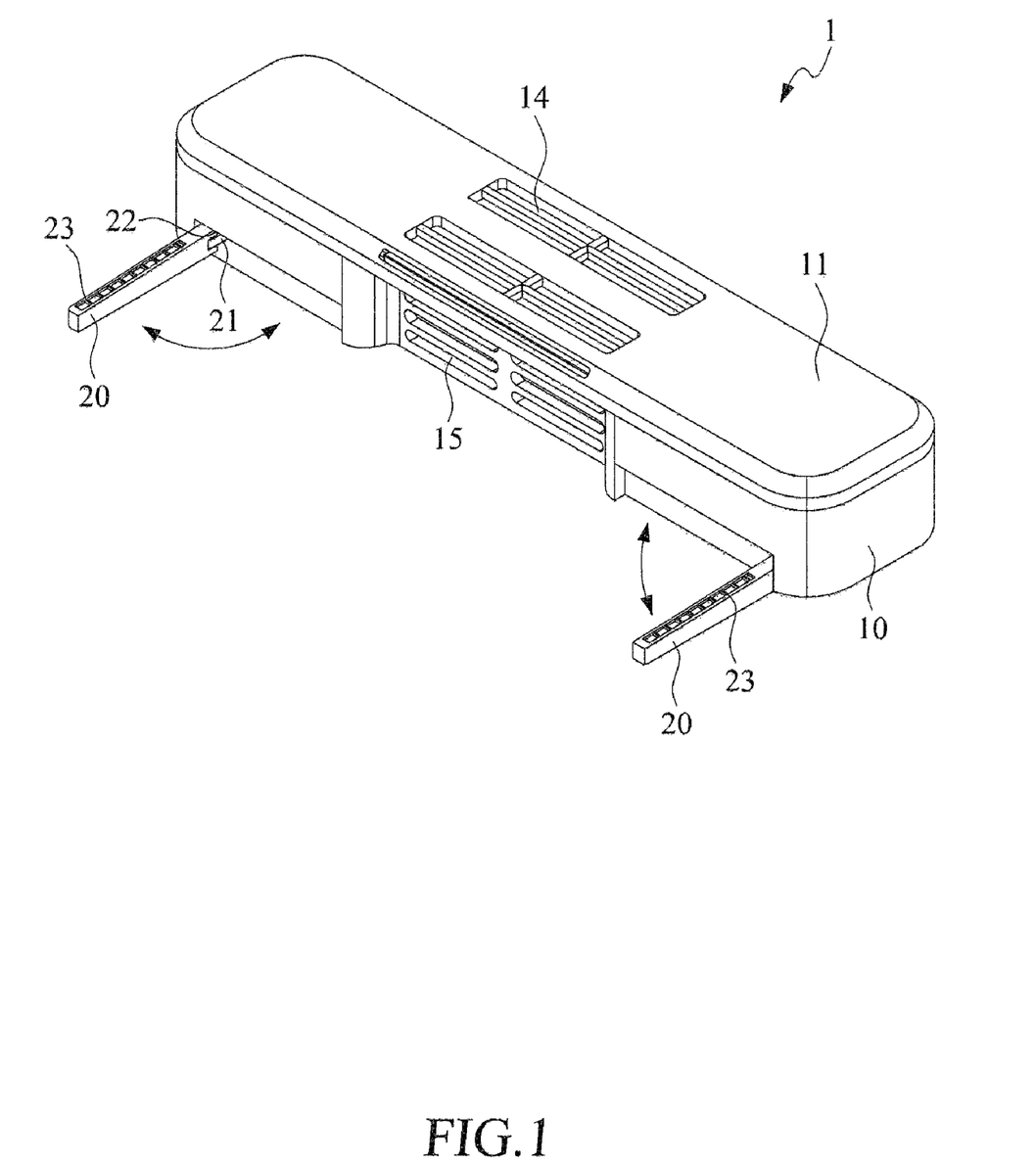
FIG. 1 is a perspective view showing a portable heat dissipation device in accordance with a first embodiment of the present invention.
Figure 2:
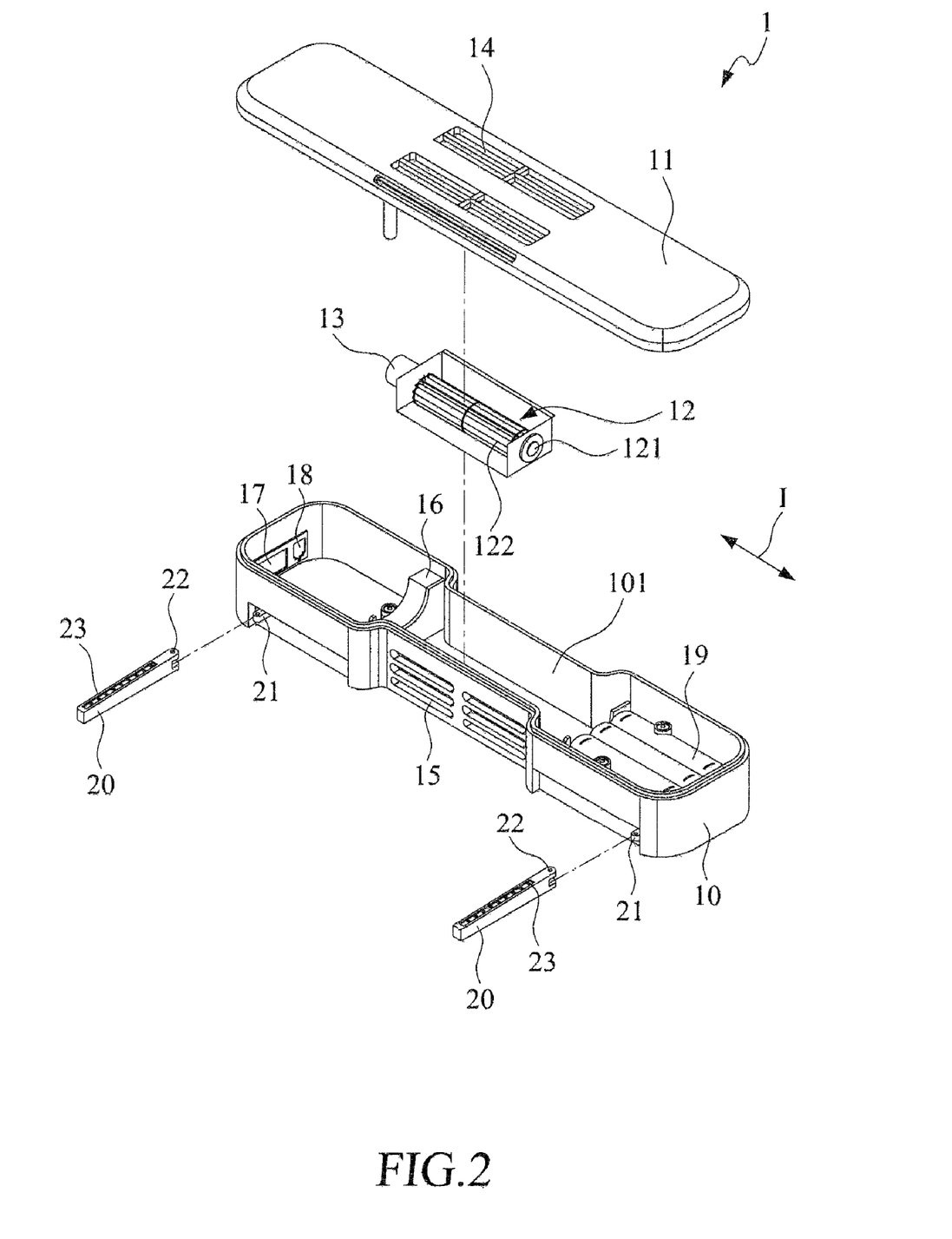
FIG. 2 is an exploded view of the portable heat dissipation device of the present invention with movable support arms of the heat dissipation device being extended.

With reference to the drawings and in particular to FIGS. 1 and 2, a portable heat dissipation device constructed in accordance with a first embodiment of the present invention comprises an enclosure 1 that is configured for easy carrying and use. The enclosure 1 is comprised of a lower container 10 and a top cover 11. The enclosure 1 forms therein a receiving space 101 that is comprised of a plurality of chambers for respectively receiving and retaining inside parts/components/devices of the portable heat dissipation device, which include an air flow generation device that is set in a particular chamber. The air flow generation device comprises a cross flow fan 12 and a driving source 13. As shown, the cross flow fan 12 is set in a middle chamber of the lower container 10. The driving source 13 is coupled to a left-side end of the cross flow fan 12 and is positioned leftward of the cross flow fan 12 and fit in a complementary shaped recess defined in an internal wall of the lower container 10 for securely retained.

The cross flow fan 12 comprises a shaft 121 and a plurality of blades 122 that extends in an axial direction I of the shaft 121 and is fixed to a circumference of the shaft 121. The driving source 13 is coupled to the shaft 121 of the cross flow fan 12 for rotating the blades 122, whereby the cross flow fan 12 draws in air from inlet openings 14 and discharges the air through outlet openings 15 to form air flows that travels in a direction substantially normal to the axial direction I toward a target electronic device 24 (for example a notebook computer).

The portable heat dissipation device of the present invention further comprises a vibration-resistant noise-isolation material 16, such as cotton or similar materials, which is positioned in the chamber in a left-hand side portion of the lower container 10 for receiving the driving source 13, for wrapping around the driving source 13. Since noise is always generated when the heat dissipation device is turned on, arranging the vibration-resistant noise-isolation material 16 in the chamber for receiving the driving source 13 effectively reduces the levels of noise and vibration due to the driving source 13 being wrapped around by the vibration-resistant noise-isolation material 16.

Further, the driving source 13 is connected to a multiple-position switch 17, an external power inlet port 18, and a built-in battery set 19. The multiple-position switch 17 provides multiple-position switching operation to selectively set the rotational speed of the cross flow fan 12 for adjusting the air flow speed and the wind power provided thereby. Further, since the external power inlet port 18 and the built-in battery set 19 are provided, an operator manipulating the device is provided with multiple choices of supply of power, so that besides the built-in battery set, an external power supply may also be selectively applied through for example a regular power socket or a USB (Universal Serial Bus) connector.

Once these constituent parts/components are properly set in the lower container 10, the top cover 11 are closed to seal the lower container 10 so as to form a sealed internal space with only air passages defined in a front side wall of the lower container 10 and a top wall of the top cover 11 to correspond in position to the cross flow fan 12 for air to flow therethrough, and grating members are fit in the passages to define rows of slim openings. In the embodiment illustrated, the air passages formed in the top cover 11 define the inlet openings 14, while the air passages formed in the lower container define the outlet openings 15. Opposite sides of each outlet opening 15 are configured as being curve and outward divergent to help guiding the air flows. The above described air passages allow air to enter in a substantially vertical direction and to leave in a substantially horizontal direction to effect operations of heat dissipation for various electronic devices.

In the preferred embodiment illustrated in the drawings, the lower container 10 forms in the wall in which the inlet openings 14 are defined two recessed chambers that are respectively located at left and right hand side portions of a bottom portion of the wall to receive and support two movable support arms 20 that are rotatable on a horizontal plane. The movable support arms 20 are rotatable about rotation axes that are respectively defined by pivots 21. The pivots 21 are located on the outer sides of the recessed chambers and are respectively joined to pivoting sections 22 of the movable support arms 20. To set the movable support arms 20 in an operation condition, forces are applied thereto to extend the movable support arms 20; and in a non-use condition, to facilitate storage, the movable support arms 20 are rotated inward to fit into the recessed chambers for collapsing to store, which eliminates the inconveniences of carrying due to outward extending, whereby space saving and easy carrying can be realized.

When an electronic device from which heat is to be dissipated is set on the extended movable support arms 20, to enhance the stability of positioning of the electronic device, as shown in the drawings, each movable support arm 20 has an upper surface that is inclined, whereby one end of the electronic device that is positioned thereon can be set in tight engagement with the movable support arm 20 while an opposite end of the electronic device can be set on for example a desk top or the ground, making it difficult for the electronic device to undesirably shake. The inclined surface of the movable support arm 20 may be further provided with a damper pad 23 to increase the frictional force thereof with the electronic device, making it difficult for the electronic device to slide. The movable support arms 20 are two slender parts in the present invention and thus, the contact surface area thereof with the electronic device is relatively small as compared to the known techniques, with remaining area of the electronic device being exposed to the atmosphere so as to cause no interference with the design of the electronic device that draw in air flow from the underside thereof and also to increase the contact area of the electronic device with the surrounding air to effect high performance of heat dissipation.

Figure 3:
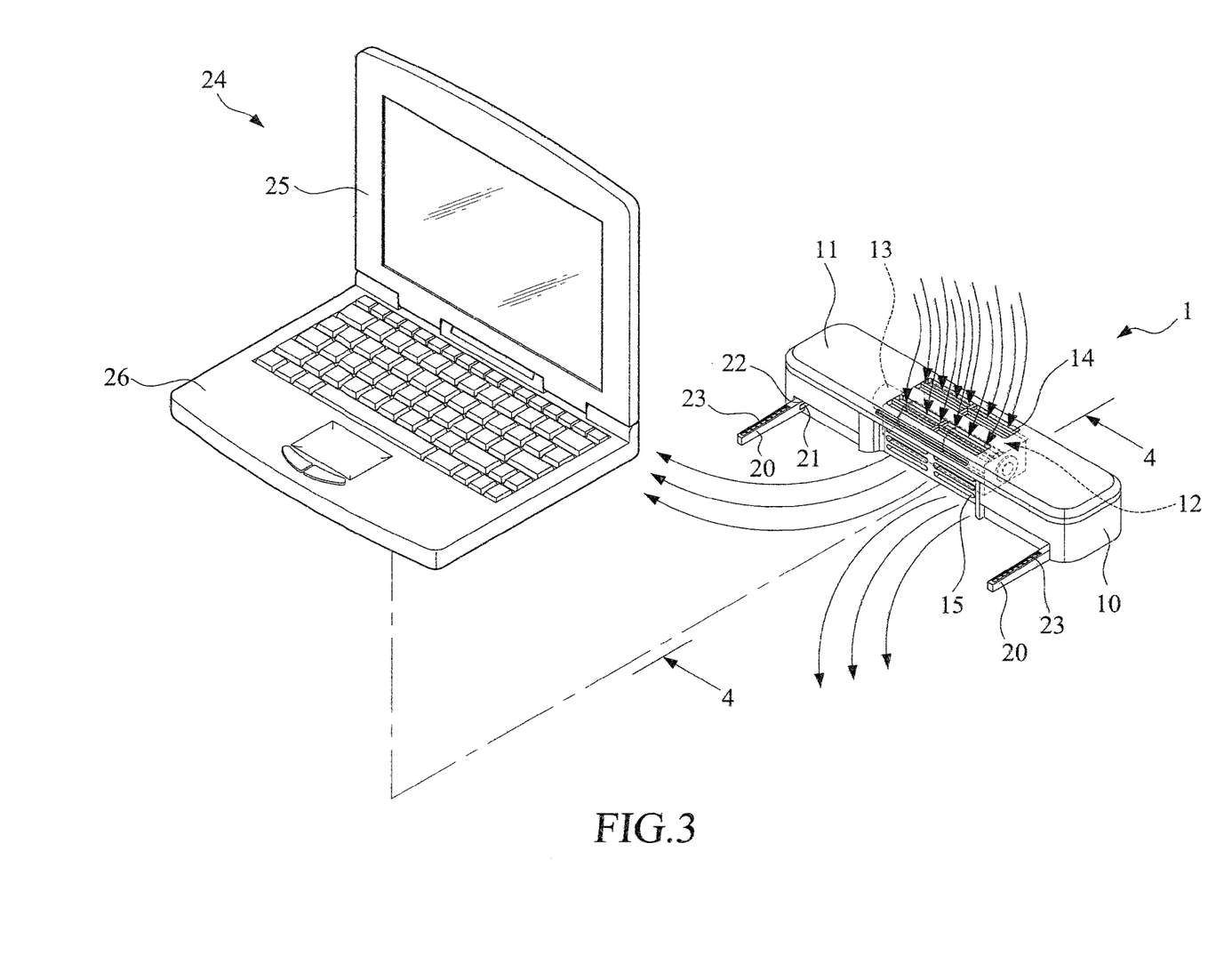
FIG. 3 is a perspective view illustrating an application of the portable heat dissipation device of the present invention to realize heat dissipation of a notebook computer.
Figure 4:
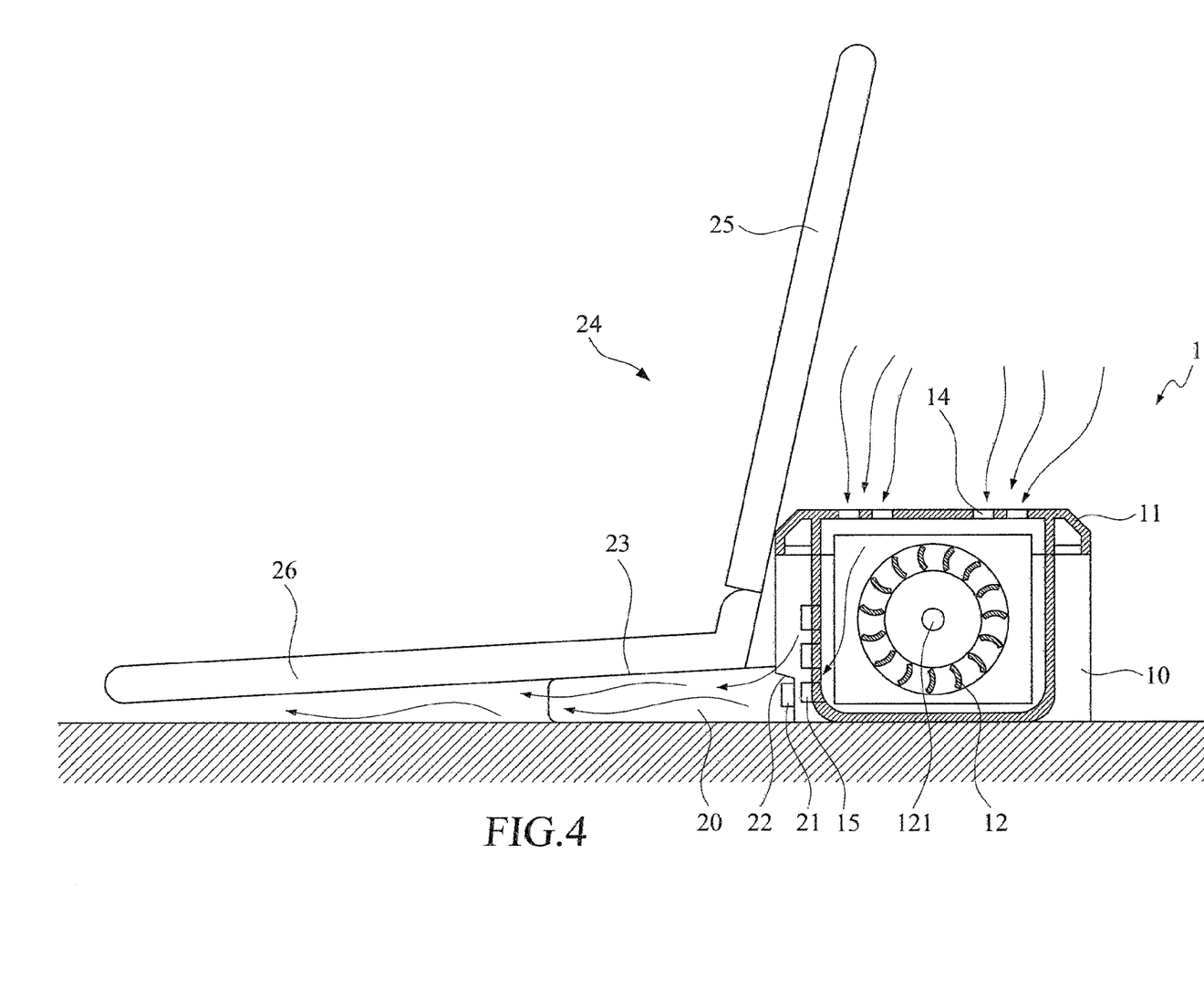
FIG. 4 is a cross-sectional view taken along line 4-4 of FIG. 3 to illustrating the operation of heat dissipation of the notebook computer.

As shown in FIGS. 3 and 4, to practice the present invention, for example, a notebook computer 24 is positioned on the movable support arms 20 whereby a keypad 26 of the notebook computer is set in slight inclination with an end of the notebook computer engaging the desk top and an opposite end tightly engaging the damper pads 23 of the movable support arms 20 to securely hold the notebook computer in position. Thus, when a user operates the keypad 26, the notebook computer 24 is set in an angular position that is comfortable for operation, making it easy for the user operating the keypad 26 without feeling tired.

Further, since the inlet openings 14 and the outlet openings 15 are set in the surfaces of the top cover 11 and the lower container 10 that are perpendicular to each other, the air flows that enter the inlet openings 14 may effect heat dissipation for a display 25 of the notebook computer first and after the air flows are subjected to direction change by the cross flow fan 12, the air flows that are discharged through the outlet openings 15 may sufficiently contact the underside of the keypad due to the raised condition of the notebook computer provided by the inclination of the movable support arms 20 to effectively carry out heat dissipation. Since the keypad 26 is set on the desk top at the end thereof that is close to the user, the air flows from the outlet openings 15 are forced to spread outward through opposite lateral sides of the keypad 26.

Figure 5:
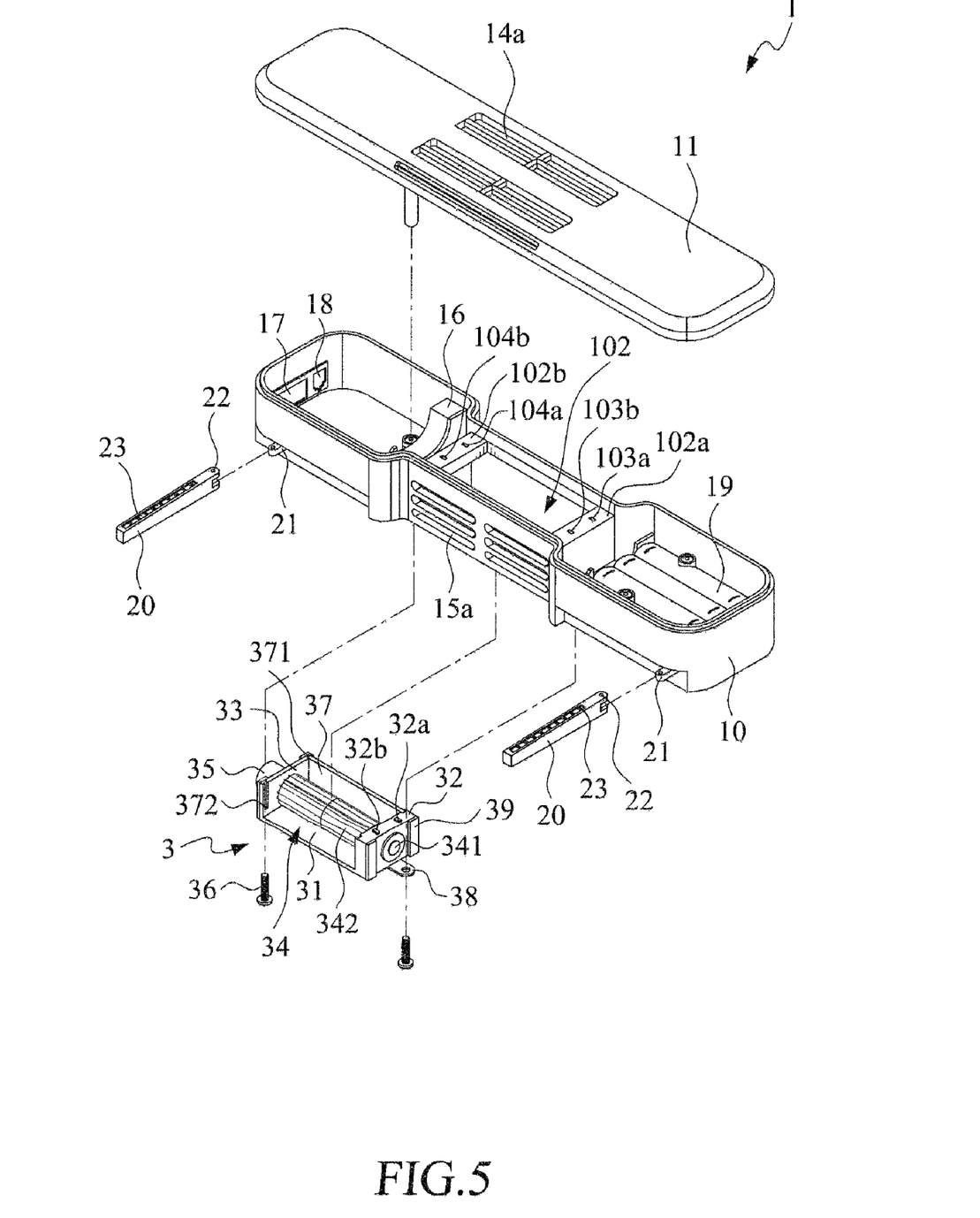
FIG. 5 is an exploded view of the portable heat dissipation device of the present invention with movable support arms of the heat dissipation device being extended in accordance with a second embodiment of the present invention.
Figure 7:
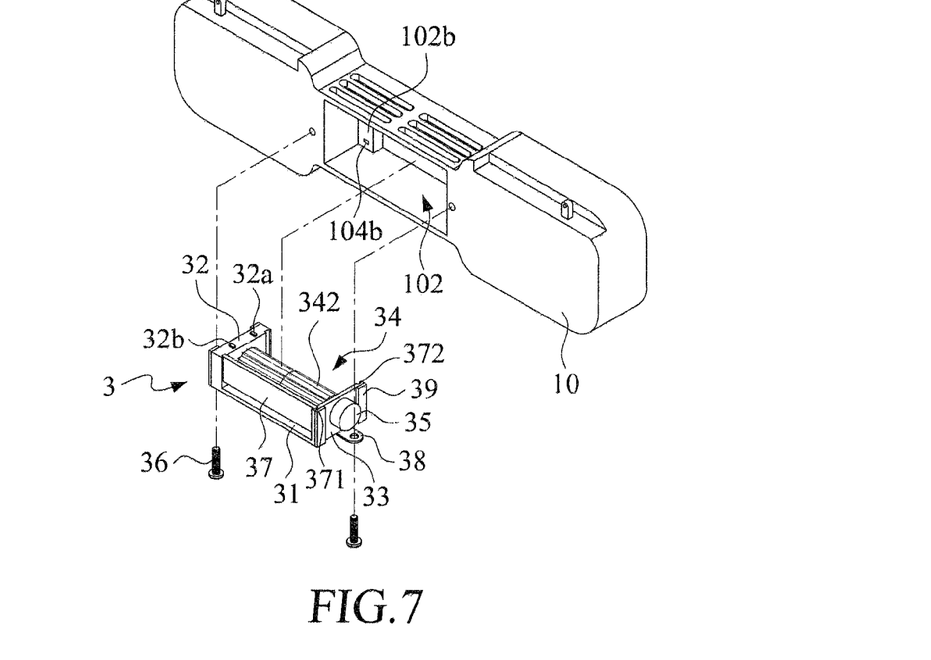
FIG. 7 is an exploded view showing a direction-exchangeable air flow generation module at a second assembly position is separated from an enclosure of the portable heat dissipation device.
Figure 8:
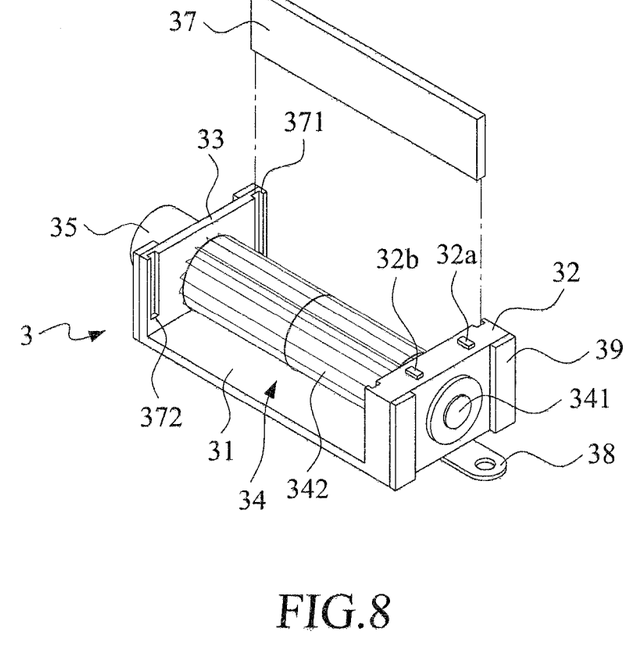
FIG. 8 is an exploded view showing an air guiding plate is vertically mounted to a slot of an assembly frame of a direction-exchangeable air flow generation module.
Figure 9:
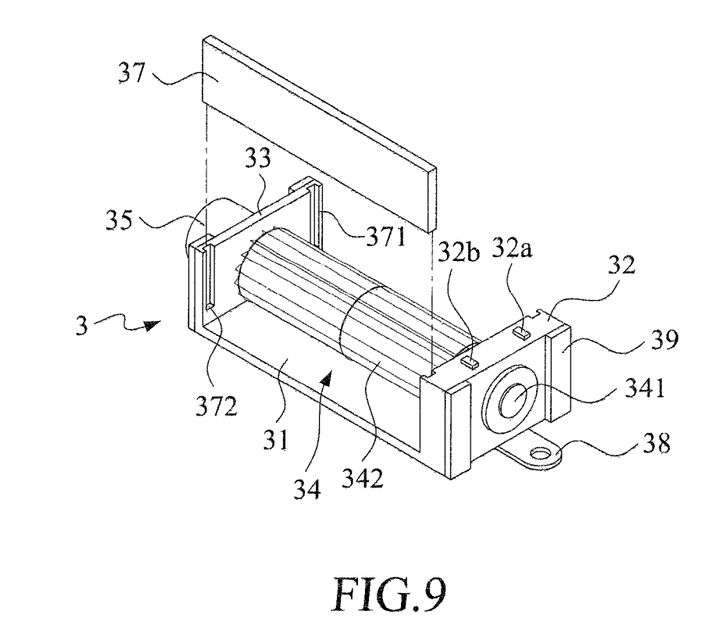
FIG. 9 is an exploded view showing an air guiding plate is vertically mounted to the other slot of an assembly frame of a direction-exchangeable air flow generation module.

With reference to the drawings and in particular to FIGS. 5 and 9, a portable heat dissipation device constructed in accordance with a second embodiment of the present invention is shown. In this embodiment, the enclosure defines at least one first air flowing opening 14a and at least one second air flowing opening 15a. A concave accommodating dock 102 is formed in the receiving space 101 of the enclosure 1. The concave accommodating dock 102 is provided with a first section 102a and a second section 102b correspondingly opposite to the first section 102a.

A pair of first conductive elements 103a, 103b are spaced each other and arranged at the first section 102a. A pair of second conductive elements 104a, 104b are spaced each other and arranged at the second section 102b.

A direction-exchangeable air flow generation module 3 comprising an assembly frame 31 having a first end plate 32 and a second end plate 33 correspondingly opposite to the first end plate 31. A pair of conductive terminals 32a, 32b spaced each other and arranged at the first end plate 32.

A cross flow fan 34 has a shaft 341 supported between the first end plate 32 and the second end plate 33 of the assembly frame 31 and a plurality of blades 342 extending in an axial direction of the shaft 341 and fixed to a circumference of the shaft 341. A driving source 35 is mounted on the assembly frame 31 and coupled to the shaft 341 of the cross flow fan 34 for rotating the blades 342.

At least one screw 36 serving as a fixing mechanism is used to fix the direction-exchangeable air flow generation module 3 in the concave accommodating dock 102 of the enclosure 1 via a through hole formed on the tab 38.

The assembly frame 31 of the direction-exchangeable air flow generation module 3 is provided with at least one vibration-resistant member 39 on the first end plate 32 and the second end plate 33 to prevent the vibration generated by the direction-exchangeable air flow generation module 3 from transferring to the enclosure 1.

Figure 6:
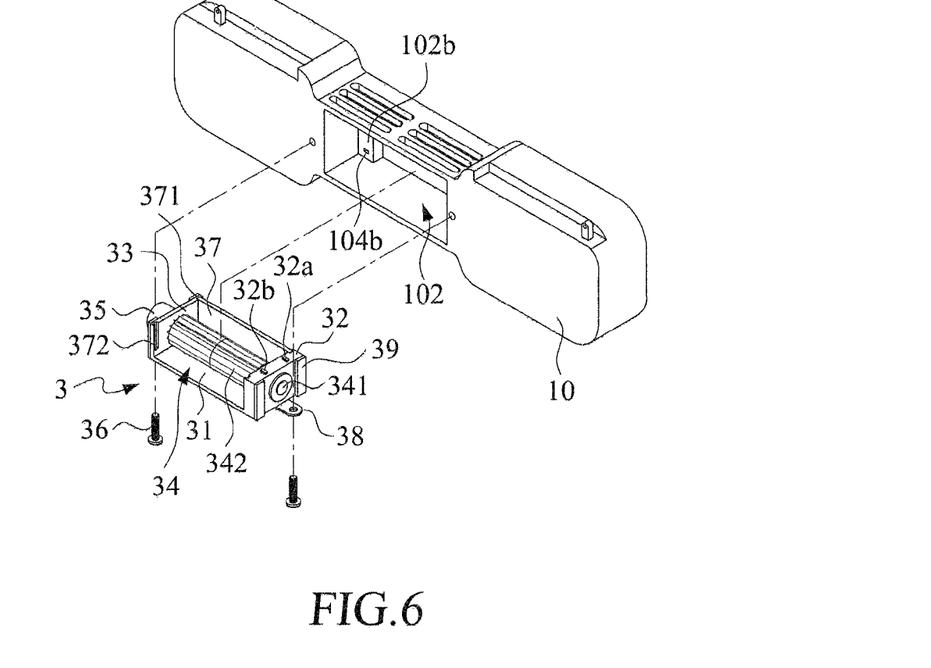
FIG. 6 is an exploded view showing a direction-exchangeable air flow generation module at a first assembly position is separated from an enclosure of the portable heat dissipation device.

The assembly frame 31 of the direction-exchangeable air flow generation device 3 may be mounted into the concave accommodating dock 102 of the enclosure 1 at a first assembly position, as shown in FIG. 6, so that the conductive terminals 32a, 32b on the assembly frame 31 electrically contact the first conductive elements 103a, 103b respectively. When the assembly frame 31 is at the first assembly position, the first air flowing opening 14a serves as an inlet opening and the second air flowing opening 15a serves as an outlet opening. In alternative, the assembly frame 31 of the direction-exchangeable air flow generation device 3 may be mounted into the concave accommodating dock 102 of the enclosure 1 at a second assembly position, as shown in FIG. 7, so that the conductive terminals 32a, 32b on the assembly frame 31 electrically contact the second conductive elements 104a, 104b respectively. When the assembly frame 31 is at the second assembly position, the first air flowing opening 14a serves as an outlet opening and the second air flowing opening 15a serves as an inlet opening.

With reference to FIGS. 8, 9, the direction-exchangeable air flow generation module 3 may comprise an air guiding plate 37 which may be vertically mounted to the assembly frame 31 between the first end plate 32 and the second end plate 33 by means of slots 371. The air guiding plate 37 is parallel to the axial direction of the shaft 341 and adjacent to the cross flow fan 34 with a suitable distance. The air guiding plate 37 is used to guide the air flow generated by the cross flow fan 34. The air guiding plate 37 may be removed from the slots 371 and alternatively mounted to the assembly frame 31 between the first end plate 32 and the second end plate 33 by means of another slots 372.

Figure 10:
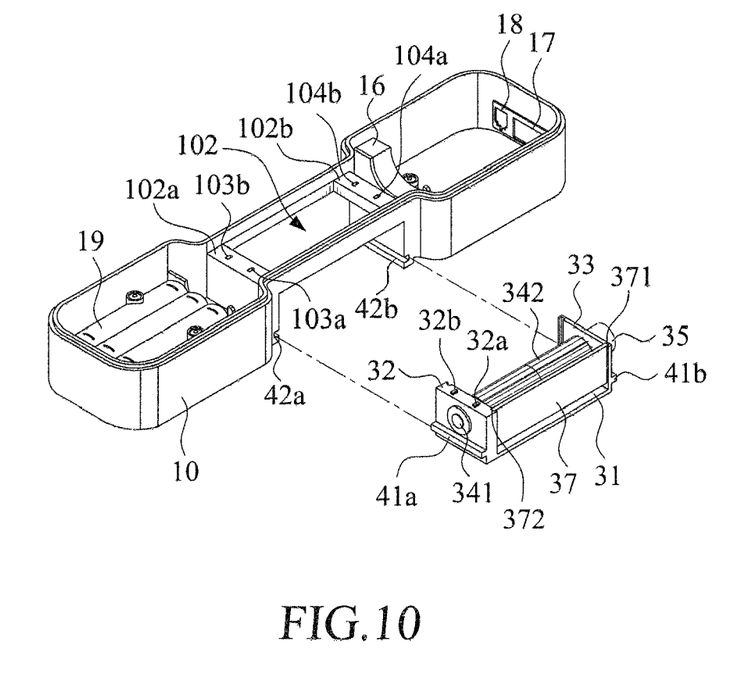
FIG. 10 is an exploded view showing a direction-exchangeable air flow generation module slides into a concave accommodating dock of an enclosure.

As shown in FIG. 10, the fixing mechanism described above may be replaced by a known slid mechanism to mounting the direction-exchangeable air flow generation module 3 into the concave accommodating dock 102 of the enclosure 1 by means of slid operation. The slid mechanism may comprise a pair of extended slots 42a, 42b formed on the concave accommodating dock 102 of the enclosure 1, and a pair of guiding rails 41a, 41b formed on the first end plate 32 and the second end plate 33.

Figure 11:
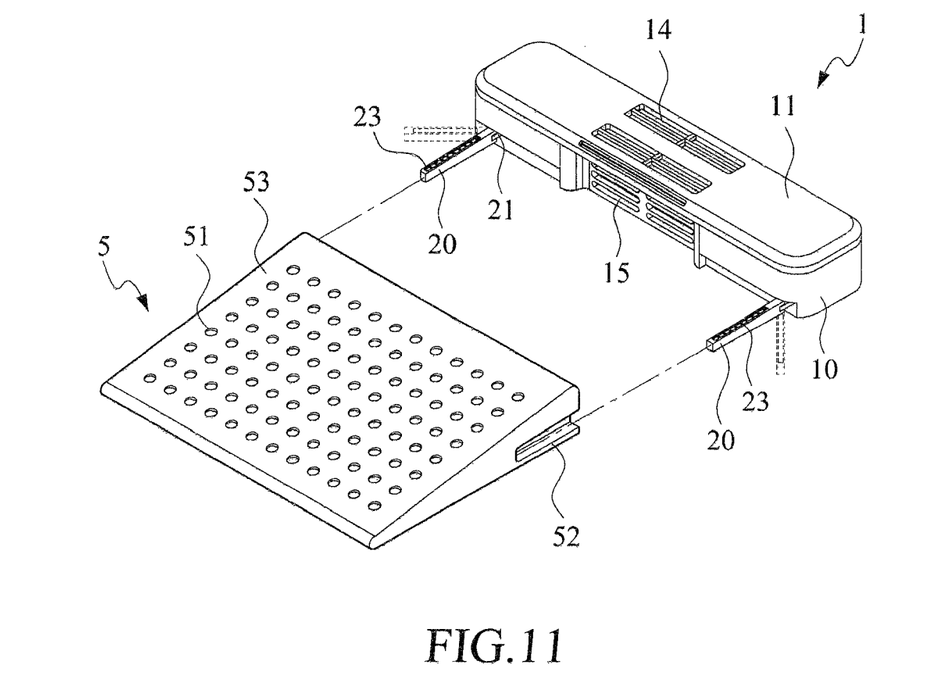
FIG. 11 is an exploded view showing a device supporting plate is mounted to one side of an enclosure by sliding a pair of collapsible movable support arms to corresponding slots formed on side wall of the device supporting plate.

With reference to FIG. 11, a device supporting plate 5 may be mounted to one side of the enclosure 1 by sliding the collapsible movable support arms 20 to corresponding slots 52 formed on side wall of the device supporting plate 5. Preferably, the device supporting plate 5 is provided with an inclined top plate 53 with a plurality of through holes 51 arranged on the inclined top plate 53, so that a target electronic device 24 (for example a notebook computer) may be supported on the inclined top plate 53, and then the device supporting plate 5 may be further placed on a user's legs for use.

Figure 12:
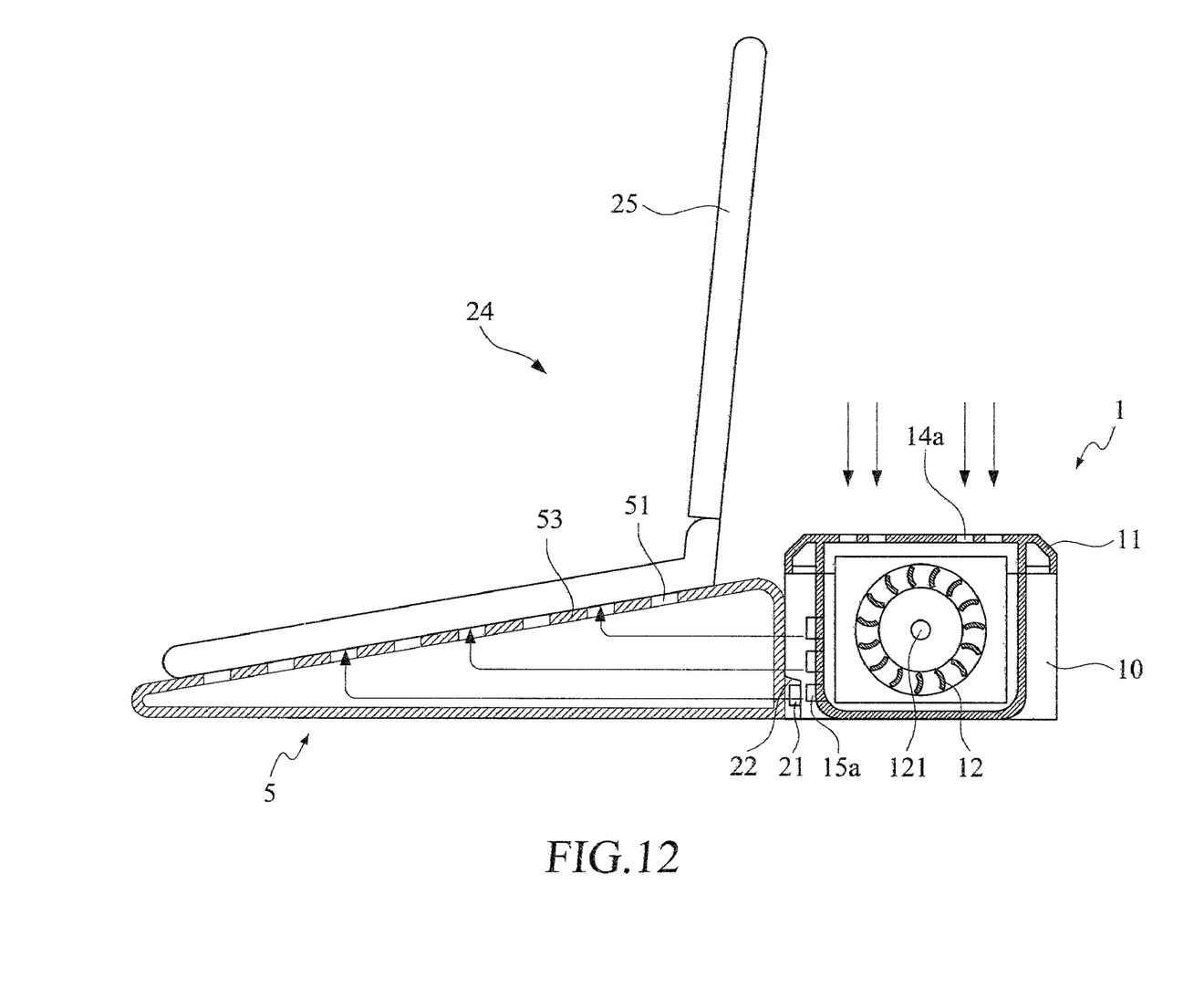
FIG. 12 is a cross-sectional view illustrating the operation of heat dissipation of the notebook computer when a cross flow fan is rotated forwardly.
Figure 13:
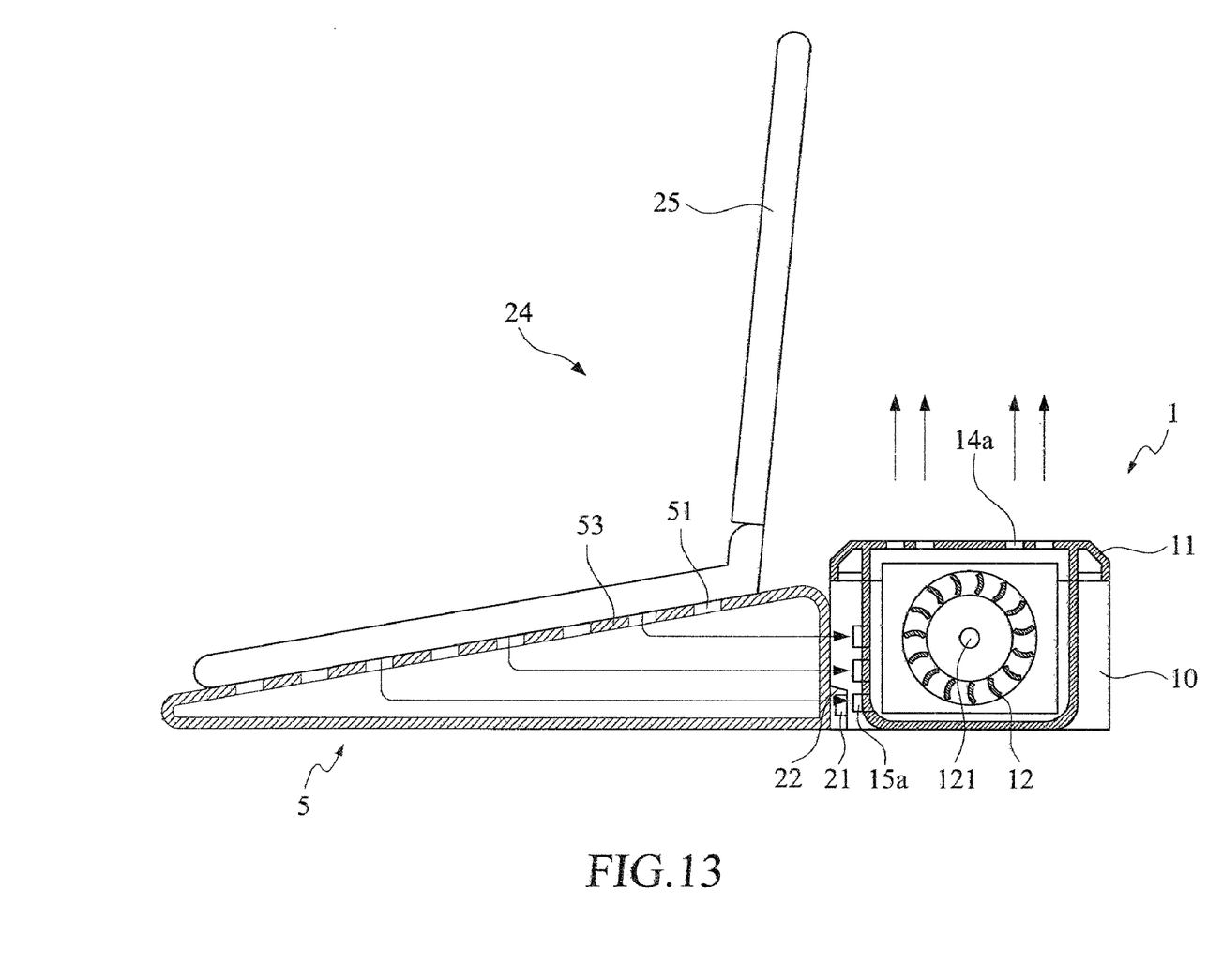
FIG. 13 is a cross-sectional view illustrating the operation of heat dissipation of the notebook computer when a cross flow fan is rotated backwardly.

An air flow is generated from the first air flowing opening 14a to the second air flowing opening 15a when the cross flow fan 12 is rotated forwardly, as shown in FIG. 12. On contrary, an air flow is generated from the second air flowing opening 15a to the first air flowing opening 14a when the cross flow fan 12 is rotated backwardly, as shown in FIG. 13.

The present invention provides portable heat dissipation device that can be powered by a built-in battery set or an external power supply to realize high performance of heat dissipation with extended operation time period and is effective in removing heat from various electronic devices.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A portable heat dissipation device adapted to dissipate heat from a target electronic device, the portable heat dissipation device comprising:
    an enclosure, which defines at least one first air flowing opening and at least one second air flowing opening;
    a concave accommodating dock formed on the enclosure, having a first section and a second section correspondingly opposite to the first section;
    a pair of first conductive elements spaced each other and arranged at the first section on the concave accommodating dock; a pair of second conductive elements spaced each other and arranged at the second section on the concave accommodating dock;
    a direction-exchangeable air flow generation module, comprising:
        an assembly frame having a first end plate and a second end plate correspondingly opposite to the first end plate;
        a pair of conductive terminals spaced each other and arranged at the first end plate of the assembly frame; and
        a cross flow fan, which has a shaft supported between the first end plate and the second end plate of the assembly frame and a plurality of blades extending in an axial direction of the shaft and fixed to a circumference of the shaft; a driving source, which is mounted on the assembly frame and coupled to the shaft of the cross flow fan for rotating the blades, whereby the cross flow fan draws in air through the first opening and generates at the second opening an air flow that travels in a direction substantially perpendicular to the axial direction toward the target electronic device; and
        a fixing mechanism for fixing the direction-exchangeable air flow generation module in the concave accommodating dock of the enclosure;
    wherein the assembly frame of the direction-exchangeable air flow generation device having a first assembly position adapted to be mounted into the concave accommodating dock of the enclosure so that the conductive terminals on the assembly frame electrically contact the first conductive elements on the concave portion of the fan module accommodating dock, and the assembly frame of the direction-exchangeable air flow generation device having a second assembly position selectively adapted to be mounted into the concave accommodating dock of the enclosure so that the conductive terminals on the assembly frame electrically contact the second conductive elements on the concave portion of the fan module accommodating dock.

2. The portable heat dissipation device as claimed in claim 1, wherein the enclosure comprises a lower container and a top cover mounted to the lower container, the first air flowing opening being defined in the top cover and the second air flowing opening being defined in a wall of the lower container that is substantially perpendicular to the top cover.

3. The portable heat dissipation device as claimed in claim 1, wherein the enclosure further comprises a vibration-resistant noise-isolation material that supports the driving source.

4. The portable heat dissipation device as claimed in claim 1, wherein the air flow generation device is connected to a multiple-position switch.

5. The portable heat dissipation device e as claimed in claim 1, wherein the enclosure forms an external power socket.

6. The portable heat dissipation device as claimed in claim 1, wherein the enclosure comprises at least a pair of collapsible movable support arms.

7. The portable heat dissipation device as claimed in claim 1, further comprising a device supporting plate mounted to one side of the enclosure by the collapsible movable support arms, the device supporting plate being provided with an inclined top plate.

8. The portable heat dissipation device as claimed in claim 7, the device supporting plate being formed with a plurality of through holes arranged on the inclined top plate.

9. The portable heat dissipation device as claimed in claim 6, wherein the movable support arm has an upper surface that is inclined.

10. The portable heat dissipation device as claimed in claim 6, wherein the movable support arm has an upper surface that is provided with a damper pad.

11. The portable heat dissipation device as claimed in claim 1, wherein the first air flowing opening serves as an inlet opening and the second air flowing opening serves as an outlet opening when the assembly frame of the direction-exchangeable air flow generation device is at the first assembly position, and the first air flowing opening serves as an outlet opening and the second air flowing opening serves as an inlet opening when the assembly frame of the direction-exchangeable air flow generation device is at the second assembly position.

12. The portable heat dissipation device as claimed in claim 1, wherein the direction-exchangeable air flow generation module further comprises an air guiding plate mounted to the assembly frame between the first end plate and the second end plate, the air guiding plate being parallel to the axial direction of the shaft and adjacent to the cross flow fan with a distance.

13. The portable heat dissipation device as claimed in claim 1, wherein the assembly frame of the direction-exchangeable air flow generation module is provided with at least one vibration-resistant member on the first end plate and the second end plate.

14. The portable heat dissipation device as claimed in claim 1, wherein the fixing mechanism comprises a pair of tabs formed on the first end plate and the second end plate respectively.

* * * * *